United States Patent
Ren et al.

(10) Patent No.: US 11,527,074 B1
(45) Date of Patent: Dec. 13, 2022

(54) SYSTEMS AND METHODS FOR DEEP MULTI-TASK LEARNING FOR EMBEDDED MACHINE VISION APPLICATIONS

(71) Applicants: Continental Automotive GmbH, Hannover (DE); Nanyang Technological University, Singapore (SG)

(72) Inventors: Shen Ren, Singapore (SG); Csaba Nemes, Dunakeszi (HU); Regina Deak-Meszlenyi, Budapest (HU); Sinno Jialin Pan, Singapore (SG)

(73) Assignees: Continental Automotive Technologies GmbH, Hannover (DE); Nanyang Technological University, Singapore (SG)

( * ) Notice: Subject to any disclaimer, the term of this patent is extended or adjusted under 35 U.S.C. 154(b) by 0 days.

(21) Appl. No.: 17/534,845

(22) Filed: Nov. 24, 2021

(51) Int. Cl.
*G06V 20/56* (2022.01)
*G06N 5/04* (2006.01)
(Continued)

(52) U.S. Cl.
CPC ........... *G06V 20/56* (2022.01); *G06K 9/6257* (2013.01); *G06N 3/04* (2013.01); *G06N 5/04* (2013.01)

(58) Field of Classification Search
CPC ........ G06V 20/56; G06V 10/82; G06V 20/41; G06V 10/25; G06V 10/44; G06V 10/457; G06V 10/471; G06V 10/50; G06V 20/58; G06V 20/588; G06V 20/64; G06V 20/695; G06V 2201/06; G06V 40/19; G06V 40/193; G06V 40/28; G06K 9/6257;
(Continued)

(56) References Cited

U.S. PATENT DOCUMENTS

2018/0150681 A1  5/2018 Wang et al.
2019/0108447 A1* 4/2019 Kounavis ............... G06V 40/28
(Continued)

FOREIGN PATENT DOCUMENTS

CN  109325515 A  2/2019
CN  112232511 A  1/2021

OTHER PUBLICATIONS

Arora et al. "On the Optimization of Deep Networks: Implicit Acceleration by Overparameterization," Proceedings of the 35th International Conference on Machine Learning, PMLR 80, 2018, Stockholm, Sweden; 10 pages.
(Continued)

*Primary Examiner* — Nimesh Patel
(74) *Attorney, Agent, or Firm* — Morrison & Foerster LLP

(57) ABSTRACT

A computer-implemented method includes receiving data generated using at least one sensor of a vehicle; and simultaneously performing multiple different prediction tasks on the data using a multi-task neural network, wherein the multi-task neural network comprises at least one shared parameter inference matrix comprising parameters shared between the multiple different prediction tasks, and the at least one shared parameter inference matrix was overparameterized during training into at least one shared parameter matrix and multiple task-specific parameter matrices, each of the multiple task-specific parameter matrices being associated with a different one of the multiple different tasks.

28 Claims, 6 Drawing Sheets

(51) Int. Cl.
*G06N 3/04* (2006.01)
*G06K 9/62* (2022.01)

(58) Field of Classification Search
CPC .......... G06K 9/00671; G06K 9/00496; G06K 9/3216; G06K 9/00791; G06K 9/00711; G06K 9/46; G06K 9/00798; G06K 9/00369; G06K 9/6292; G06K 9/00201; G06K 9/00288; G06K 9/00624; G06K 9/20; G06K 9/3233; G06K 9/36; G06K 9/4604; G06N 3/04; G06N 5/04; G06N 20/00; G06N 3/0454; G06N 3/049; G06N 3/0635; G06N 10/00; G06N 3/088; G06N 3/08; G06N 5/022; G06N 7/005; G06N 3/063; G06N 5/003; G06N 5/02; G06T 5/006; G06T 2207/10021; G06T 2207/10016; G06T 3/0062; G06T 3/0018; G06T 15/205; G06T 19/003; G06T 3/0093; G06T 7/70; G06T 2207/30252; G06T 7/38; G06T 7/521; G06T 7/73; G06T 19/00; G06T 2207/20132; G06T 2207/20192; G06T 3/4084; G06T 5/002; G06T 7/292; G06T 7/74; G06T 2207/20112; G06T 5/00; G06T 7/246; G06T 7/55; G06T 17/00; G06T 17/05; G06T 13/20; G06T 13/80; G06T 2200/04; G06T 2207/10136; G06T 2207/30232; G06T 2213/12; G06T 3/00; G06T 7/00; G06T 7/0008; G06T 7/85; G06T 2207/20084; G06T 2207/20081; G06T 2207/10028; G06T 2207/20076; G06T 2207/20156; G06T 7/0004; G06T 7/0012; G06T 7/10; G06T 7/77; G06T 7/11; G06T 7/187; G05D 1/0088; G05D 1/0221; G05D 1/0246; G05D 2201/0213; G05D 1/00; G05D 1/0055; G05D 1/0214; G08G 1/0112; G08G 1/0116; G08G 1/012; G08G 1/0129; G08G 1/0145; G08G 5/0026; G08G 5/0082; G08G 5/065; G08G 1/205
See application file for complete search history.

(56) References Cited

U.S. PATENT DOCUMENTS

| | | | | |
|---|---|---|---|---|
| 2019/0258251 | A1* | 8/2019 | Ditty | G06V 20/58 |
| 2020/0311180 | A1 | 10/2020 | Cho et al. | |
| 2020/0320278 | A1 | 10/2020 | Ng et al. | |
| 2021/0112441 | A1* | 4/2021 | Sabella | H04W 40/18 |
| 2021/0334630 | A1* | 10/2021 | Lambert | G06F 17/18 |
| 2021/0342677 | A1* | 11/2021 | Dalli | G06N 3/063 |

OTHER PUBLICATIONS

Badrinarayanan et al. (Dec. 2017) "SegNet: A Deep Convolutional Encoder-Decoder Architecture for Image Segmentation," IEEE Transactions on Pattern Analysis and Machine Intelligence, 39(12): 2481-2495.
Cao et al. (Jun. 2020). "DO-Conv: Depthwise Over-parameterized Convolutional Layer," doi:arXiv:2006.12030v1; 10 pages.
Caruana. (Sep. 1997). "Multitask Learning," CMU-CS-97-203, School of Computer Science, Carnegie Mellon University, Pittsburgh, PA; 255 pages.
Chen et al. "GradNorm: Gradient Normalization for Adaptive Loss Balancing in Deep Multitask Networks," Proceedings of the 35th International Conference on Machine Learning, PMLR 80, 2018, Stockholm Sweden; 12 pages.
Gong et al. (Oct. 2019) "A Comparison of Loss Weighting Strategies for Multi Task Learning in Deep Neural Networks," IEEE Access 7; 141627-141632.
Guo et al. "ExpandNets: Linear Over-parameterization to Train Compact Convolutional Networks," 34th Conference on Neural Information Processing Systems (NeurIPS 2020), Vancouver, Canada; pp. 1-13.
He et al. "Deep Residual Learning for Image Recognition," Proceedings of the IEEE Conference on Computer Vision and Pattern Recognition, 2016; pp. 770-778.
Howard et al. (Apr. 2017). "MobileNets: Efficient Convolutional Neural Networks for Mobile Vision Applications," doi:arXiv:1704.04861v1; 9 pages.
Khodak et al. (May 2021). "Initialization and Regularization of Factorized Neural Layers," doi:arXiv:2015.01029v1; pp. 1-20.
Kressner et al. (Jun. 2017). "Recompression of Hadamard Products of Tensors in Tucker Format," SIAM Journal on Scientific Computing 39(5): pp. 1-29.
Krizhevsky. (Apr. 2009). "Learning Multiple Layers of Features from Tiny Images"; 60 pages.
Li et al. (Sep. 2020). "Knowledge Distillation for Multi-task Learning," doi:arXiv:2007.06889v2; 14 pages.
Liu et al. (Apr. 2019). "End-End Multi-Task Learning with Attention," doi:arXiv:1803.10704v2; 10 pages.
Liu et al. (Apr. 2019). "Improving Multi-Task Deep Neural Networks via Knowledge Distillation for Natural Language Understanding," doi:arXiv:1904.09482v1; 8 pages.
Maninis et al. (Apr. 2019). "Attentive Single-Tasking of Multiple Tasks," doi:arXiv:1904.08918v1; 14 pages.
R. Caruana. (1997). "Multitask Learning," Machine Learning, 28: pp. 41-75.
Russakovsky et al. (Jan. 2015). "ImageNet Large Scale Visual Recognition Challenge," doi:arXiv:1409.0575v3; 43 pages.
Schaul et al. (Apr. 2019). "Ray Interference: a Source of Plateaus in Deep Reinforcement Learning," doi:arXiv:1904.11455v1; 17 pages.
Silberman et al. "Indoor Segmentation and Support Inference from RGBD Images," European Conference on Computer Vision, 2012, Berlin Heidelberg; pp. 746-760.
Sun et al. "Learning Sparse Sharing Architectures for Multiple Tasks," 34th AAAI Conference on Artificial Intelligence, 2020; pp. 8936-8943.
Vandenhende et al. (Jan. 2021). "Multi-Task Learning for Dense Prediction Tasks: A Survey," doi:arXiv:2004.13379v3; pp. 1-20.
Yu et al. (Dec. 2020). "Gradient Surgery for Multi-Task Learning," doi:arXiv:2001.06782v4; pp. 1-27.

* cited by examiner

SYSTEMS AND METHODS FOR DEEP MULTI-TASK LEARNING FOR EMBEDDED MACHINE VISION APPLICATIONS

FIELD

This disclosure is related generally to machine vision, and more specifically to deep multi-task learning for embedded machine vision applications.

BACKGROUND

There is increasing interest in autonomous vehicles and, as a result, increasing development of sophisticated embedded vision systems that can capture large volumes of scene data and then apply machine-learning strategies for performing perception tasks that enable an autonomous vehicle to make decisions while maneuvering. State-of-the-art machine learning models have significantly grown in size in recent years. Large models show great expressivity but are practically difficult to deploy for embedded vision applications where inference systems have relatively limited computational capabilities and relatively low memory. Additionally, perception tasks for autonomous driving often require real-time or near real-time inference to ensure safety, but large models are usually slow in inference.

To reduce inference time with a limited computational budget and to improve joint performance, multi-task learning (MTL) is a common design choice for embedded perception tasks when multiple related tasks are to be learned and inferenced at the same time. In general, the motivations for MTL can be many-folds, including: mitigating the data sparsity challenge by exploiting useful information from other tasks, reducing inference time with a limited computational budget, in terms of both memory and computational bandwidth, improving joint performance of all tasks, and reducing training time. However, there is a trade-off between the performance of each individual task, and the multi-task model parameter size.

SUMMARY

According to various embodiments, systems and methods include an MTL neural network architecture that is over-parameterized in training for better optimization and generalization and contracted down to a compact architecture for inference, providing benefits associated with a smaller neural network. An MTL neural network includes at least one over-parameterized convolutional layer in which a weight matrix for a shared convolutional layer is factorized into a shared component and a task-specific component associated with each task. During training, each task-specific component is updated using respective task loss function while the other task-specific components and the shared component remain frozen; then, the shared component is updated using a combined loss function of all tasks and all the task-specific components are frozen (not updated). Once the model is trained, the inference model is generated by contracting the factorized convolutional layer(s) into smaller sets of weights using matrix multiplication on the shared component and task-specific components. This combines the benefits of improved optimization and generalization provided by a larger number of parameters during training with the faster inference performance associated with a smaller neural network, making the MTL neural network ideal for embedded machine vision applications.

According to an aspect, a computer-implemented method includes receiving data generated using at least one sensor of a vehicle; and simultaneously performing multiple different prediction tasks on the data using a multi-task neural network, wherein the multi-task neural network comprises at least one shared parameter inference matrix comprising parameters shared between the multiple different prediction tasks, and the at least one shared parameter inference matrix was over-parameterized during training into at least one shared parameter matrix and multiple task-specific parameter matrices, each of the multiple task-specific parameter matrices being associated with a different one of the multiple different tasks.

Optionally, the multiple different prediction tasks include semantic segmentation, depth estimation, object detection, instance segmentation, or surface normal estimation.

Optionally, the multi-task neural network includes task-specific parameter inference matrices associated with the multiple different prediction tasks.

Optionally, during training of the multi-task learning model, each of the multiple task-specific parameter matrices was trained independently using a respective task-specific loss function.

Optionally, during training of the multi-task learning model, the at least one shared parameter matrix was trained independently of the multiple task-specific parameter matrices using a shared task loss function.

Optionally, the method further includes automatically controlling the vehicle based on results of the multiple different prediction tasks Optionally, automatically controlling the vehicle based on results of the multiple different prediction tasks includes steering the vehicle, braking the vehicle, or providing an alert to an operator of the vehicle.

According to an aspect, a computing system comprising one or more processors and memory storing one or more programs for execution by the one or more processors for, the one or more programs including instructions for: receiving data generated using at least one sensor of a vehicle; and simultaneously performing multiple different prediction tasks on the data using a multi-task neural network, wherein the multi-task neural network comprises at least one shared parameter inference matrix comprising parameters shared between the multiple different prediction tasks, and the at least one shared parameter inference matrix was over-parameterized during training into at least one shared parameter matrix and multiple task-specific parameter matrices, each of the multiple task-specific parameter matrices being associated with a different one of the multiple different tasks.

Optionally, the computing system is an embedded computing system of the vehicle.

Optionally, the multiple different prediction tasks comprise semantic segmentation, depth estimation, object detection, instance segmentation, or surface normal estimation.

Optionally, the multi-task neural network comprises task-specific parameter inference matrices associated with the multiple different prediction tasks.

Optionally, during training of the multi-task learning model, each of the multiple task-specific parameter matrices was trained independently using a respective task-specific loss function.

Optionally, during training of the multi-task learning model, the at least one shared parameter matrix was trained independently of the multiple task-specific parameter matrices using a shared task loss function.

Optionally, the one or more programs include instructions for automatically controlling the vehicle based on results of the multiple different prediction tasks According to an aspect, a method for generating a multi-task machine learned neural network includes training a multi-task learning neural network on a plurality of training datasets, the multi-task learning neural network including: a plurality of task-specific modules, each task-specific module dedicated to a different task, and a shared module comprising at least one over-parameterized convolutional layer, the at least one over-parameterized convolutional layer comprising at least one shared parameter matrix and a plurality of task-specific parameter matrices; and generating a multi-task machine learned neural network for simultaneously performing multiple different prediction tasks on an dataset, the multi-task machine learned neural network comprising the trained plurality of task-specific modules and a trained shared module that comprises a matrix that is a combination of the trained at least one shared parameter matrix and the trained plurality of task-specific parameter matrices.

Optionally, the multiple different prediction tasks comprise semantic segmentation, depth estimation, object detection, instance segmentation, or surface normal estimation.

Optionally, training the multi-task learning network comprises updating factors one of the plurality of task-specific parameter matrices using a task-specific loss function while freezing factors of any other of the plurality of task-specific parameter matrices.

Optionally, training the multi-task learning network comprises updating factors of the at least one shared parameter matrix using a shared loss function while freezing parameters of the plurality of task-specific parameter matrices.

Optionally, the multi-task learning model comprises a plurality of over-parameterized convolutional layers.

Optionally, the matrix multiplication of the trained at least one shared parameter matrix and the trained plurality of task-specific parameter matrices comprises an element-wise product of the trained plurality of task-specific parameter matrices.

Optionally, the outputs of the shared module are provided as inputs to each of the plurality of task-specific modules and each task-specific module is not interconnected with any other task-specific module.

Optionally, the matrix that is a combination of the trained at least one shared parameter matrix and the trained plurality of task-specific parameter matrices is generated by matrix multiplying the at least one shared parameter matrix with a Hadamard product of the trained plurality of task-specific parameter matrices.

Optionally, the multi-task learning neural network is trained on a jointly-labelled training dataset, a disjointly labelled training dataset, or a combination of jointly-labeled and disjointly-labelled training datasets.

According to an aspect, a computing system includes one or more processors and memory storing one or more programs for execution by the one or more processors, the one or more programs including instructions for: training a multi-task learning neural network on a plurality of training datasets, the multi-task learning neural network including a plurality of task-specific modules, each task-specific module dedicated to a different task, and a shared module comprising at least one over-parameterized convolutional layer, the at least one over-parameterized convolutional layer comprising at least one shared parameter matrix and a plurality of task-specific parameter matrices; and generating a multi-task machine learned neural network for simultaneously performing multiple different prediction tasks on a dataset, the multi-task machine learned neural network comprising the trained plurality of task-specific modules and a trained shared module that comprises a matrix that is a combination of the trained at least one shared parameter matrix and the trained plurality of task-specific parameter matrices.

Optionally, the multiple different prediction tasks comprise semantic segmentation, depth estimation, object detection, instance segmentation, or surface normal estimation.

Optionally, training the multi-task learning network comprises updating factors one of the plurality of task-specific parameter matrices using a task-specific loss function while freezing factors of any other of the plurality of task-specific parameter matrices.

Optionally, training the multi-task learning network comprises updating factors of the at least one shared parameter matrix using a shared loss function while freezing parameters of the plurality of task-specific parameter matrices.

Optionally, the multi-task learning model comprises a plurality of over-parameterized convolutional layers.

Optionally, the matrix multiplication of the trained at least one shared parameter matrix and the trained plurality of task-specific parameter matrices comprises an element-wise product of the trained plurality of task-specific parameter matrices.

Optionally, the outputs of the shared module are provided as inputs to each of the plurality of task-specific modules and each task-specific module is not interconnected with any other task-specific module.

Optionally, the matrix that is a combination of the trained at least one shared parameter matrix and the trained plurality of task-specific parameter matrices is a matrix multiplication of the at least one shared parameter matrix and a Hadamard product of the trained plurality of task-specific parameter matrices.

Optionally, the multi-task learning neural network is trained on a jointly-labelled training dataset, a disjointly labelled training dataset, or a combination of jointly-labeled and disjointly-labelled training datasets.

According to an aspect, a non-transitory computer readable medium stores a data structure generated by training a multi-task learning neural network according to any one of the above methods.

BRIEF DESCRIPTION OF THE DRAWINGS

The invention will now be described, by way of example only, with reference to the accompanying drawings, in which.

DETAILED DESCRIPTION

Figure 1:
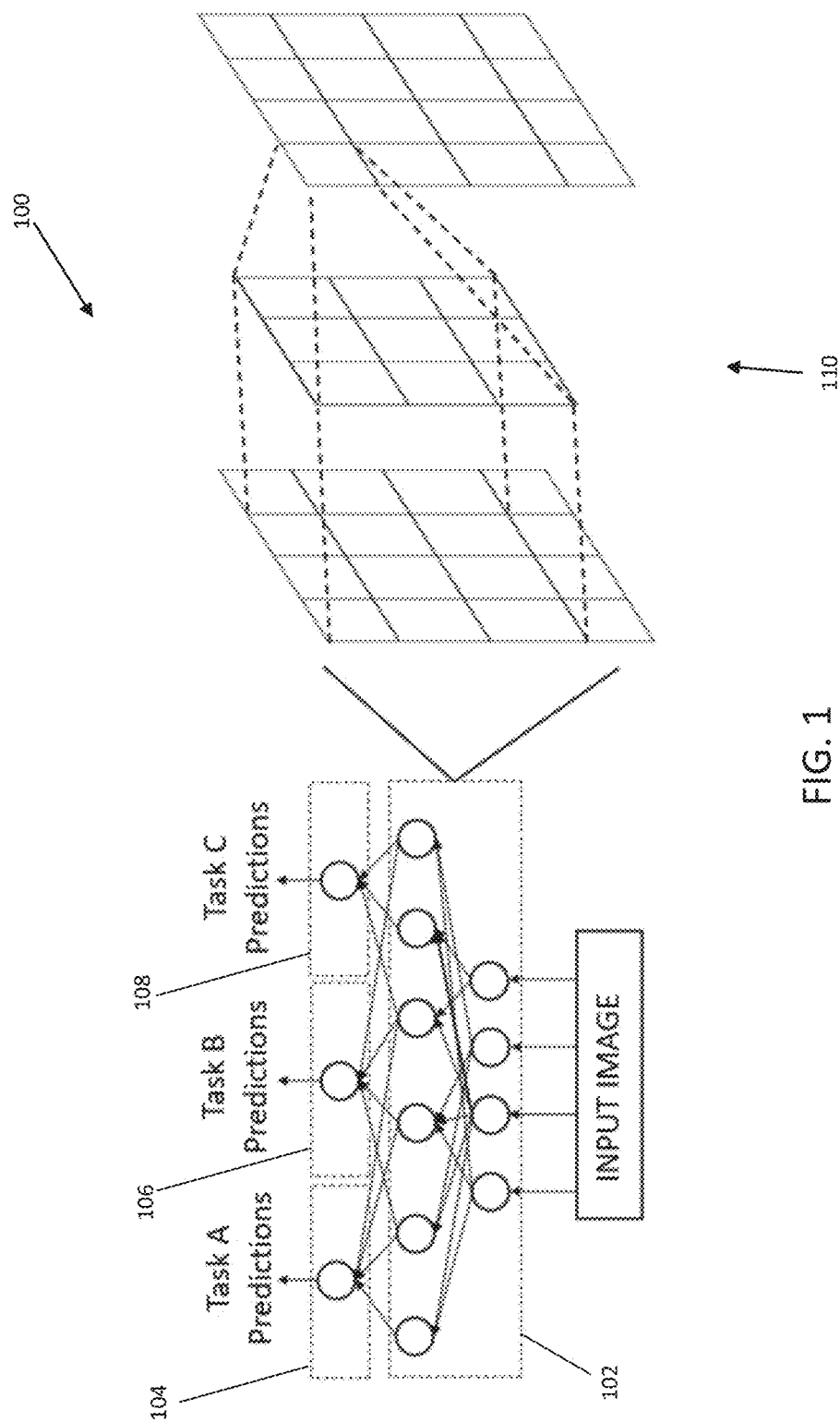
FIG. 1 illustrates an exemplary MTL neural network that can be used for embedded machine vision applications.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Systems and methods according to the principles described herein provide a deep multi-task learning neural network with improved performance while maintaining a limited inference model parameter set, which directly correlates with inference computational budget, memory, and inference time. The deep MTL neural network can be applied to multi-task embedded vision applications, in particular to real-time perceptions tasks for automated driving. The MTL neural network is not limited to embedded vision applications and can be applied to other application domains that require multiple similar perception tasks to be performed. An MTL neural network, according to the principles described herein, can be used for datasets from different types of perception sensors, including, for example, images from cameras, radar datasets, lidar datasets, ultrasound datasets, etc. An MTL neural network, according to the principles described herein, can be used for autonomous or semi-autonomous vehicles of any type, including cars and trucks, passenger aircraft, unmanned aerial vehicles (UAV), trains, boats, ships, etc.

According to various embodiments, the fully-connected layers and convolutional layers of an MTL neural network are replaced with over-parameterized layers, and the over-parameterized parameters are shared among different tasks to achieve higher performance for reduced inference parameter size and computational cost. Specifically, tensor decomposition is used for model expansion instead of model compression during training. The full-rank diagonal tensors are further expanded to be trained separately for each task, while the other tensors are shared among all tasks. For inference, the decomposed tensors that are shared among multiple tasks are contracted back into a compact MTL architecture. The number of weights in the MTL neural network that is trained can be at least two times the number of weights in the MTL neural network that is used for inference, preferably at least three times.

For any shared layer of a deep MTL model, given a weight matrix W that is shared among t tasks, the weight matrix W is reshaped into matrix m×n (output size×kernel size, input size×kernel size) and then directly factorized using Singular Value Decomposition (SVD), so that $W:=UMV$, wherein M is a diagonal matrix and the sizes of U, M, V are of size $c_o \times k \times r$, $r \times r$, $r \times k \times c_i$, respectively, with $c_o$ output size, $c_i$ input size, kernel size k×k, and rank r. Matrix M can be reparameterized into a Hadamard product (element-wise product) of t matrices corresponding to t tasks to be performed by the MTL model.

For each shared layer of the MTL model with the objective of learning, for example, tasks a and b together, the parameters U and V are shared across both tasks, and $M_a$, $M_b$ are assigned as task-specific parameters for the corresponding tasks. The task-specific parameters $M_a$, $M_b$ are learned as scaling factors in changing the scales of shared parameters U and V according to each individual task. The Hadamard product is cumulative, associative and distributive so that the sequence of the tasks will not take effect to the final product. The MTL model can be trained with parameters U and V updated by combined task losses L, and $M_a$, $M_b$ updated by task-specific losses $L_a$, $L_b$, respectively. During inference, the weights of the shared MTL model layer are contracted back to W such that the size of the inference weight matrix is not increased. The sharing mechanism can be extended naturally to multitask learning of more than 2 tasks by adding sufficient task-specific diagonal matrices, $M_1, \ldots, M_t$.

During the training phase of the over-parameterized MTL model, the factorized matrices U, $M_1, \ldots, M_t$, V are trained. The U and V matrices can be initialized using the same initialization method as the unfactorized matrix W, and U, $M_1, \ldots, M_t$ are initialized into identity matrices. The trained weight matrices are contracted back to W for inference, providing less parameter counts and computational cost but with the benefits of expanded parameters during training.

In order to train shared and task-specific parameters separately, an alternative training strategy includes two training processes for each epoch of training. First, choose one task j from all t tasks. The task-specific parameters $M_1$ are trained by task loss $L_1$. The other parameters U, V, $M_k$ where k≠j, and the parameters of unfactorized layers are kept frozen. All tasks t need to have the equal chances to be trained across the entire training process, and for each epoch, only one task-specific weight matrix is trained. Second, all task-specific factors $M_1, \ldots, M_t$ are frozen and the other parameters U, V and the parameters of other unfactorized layers are trained by joint loss of all tasks L, where $L=\Sigma_{i \in t} \alpha_i L_i$. α represents the fixed or adaptive loss weights. During each training process, Frobenius decay can be applied as a penalty on factorized matrices U, V and M to regularize the models for better generalization.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an exemplary MTL neural network 100 that can be used for embedded machine vision applications. The network 100 includes a shared module 102 used for all inference tasks and separate task-specific modules 104, 106, and 108, each used for a different task. The three task-specific modules 104, 106, and 108 correspond to three different inference tasks performed by the model. However, this is merely exemplary. In general, a network will have as many task-specific modules as there are tasks performed by the MTL network. The number of tasks performed by an MTL network, according to the principles described herein, is not limited. According to various embodiments, the outputs of the shared module 102 are provided as inputs to each of the three task-specific modules 104, 106, and 108, and the task-specific modules 104, 106, and 108 are not connected to one another.

The shared module 102 includes a plurality of convolutional layers. A convolutional layer 110 of the shared module 102 is shown in FIG. 1 for illustration. According to the principles described herein, at least one of the convolutional layers of the shared module 102 is overcomplete factorized for training and contracted back to a compact set for inference, as discussed further below.

According to various embodiments, a deep multi-task learning training method utilizes over-parameterized convolutional layers to improve model expressivity and to learn task-specific variations. The method increases parameter set size of the model during training, but the parameter set is contracted back to a compact set for inference. Without increasing any inference parameter size, a model can be further fine-tuned to improve performance of each task. The deep MTL method according to the principles described herein can be generically applied to any MTL models with convolutional layers to: 1) reduce engineering efforts to design model-specific solutions; 2) significantly improve joint performance; and 3) maintain or even reduce inference model size.

For deep neural network models, a target convolutional layer to be overcomplete factorized is parameterized by $c_i \times c_{i-1} \times k \times k$ tensors, where $c_{i-1}$ and $c_i$ are the corresponding input and output channel dimensions (where the input and output dimensions are of size $h \times w \times c_{i-1}$ and $h \times w \times c_i$) and k is the filter size. The tensor can be reshaped into a $c_i k \times c_{i-1} k$ matrix W which can be decomposed to two weight matrices U of size $c_i k \times r$ and $V^T$ of size $r \times c_{i-1} k$ where $W = UV^T$. For overcomplete factorization, the rank r should not be smaller than $\min(c_i k, c_{i-1} k)$ to avoid losing information.

According to the principles described herein, instead of a direct factorization of the model parameters, three or more parameter matrices are initialized during training, which increases the trained parameter size. Then, the set of inference parameters W is the product of the trained parameter matrices. For example, if the trained matrices are matrix U of size $c_i k \times r$, matrix M of size $r \times r$ and matrix $V^T$ of size $r \times c_{i-1} k$, the inference matrix will be $W = UMV^T$ of the original size $c_i k \times c_{i-1} k$.

The shared module 102 includes a plurality of parameters shared among the tasks, denoted as task A, B and C for the three-task example of FIG. 1. The set of shared parameters (also referred to as weights) is denoted $W_{ABC}$. The parameters of the task-specific modules 104, 106, and 108 are denoted $W_A$, $W_B$ and $W_C$, respectively. A specific convolutional layer of shared parameters of the shared module 102 is denoted as $W_{ABC}^l$, where the shared parameters $W_{ABC}$: $= W_{ABC}^n \ldots W_{ABC}^0$ and the number of shared layers is n. For simplification of explanation, $W_{ABC}^l$ is represented below as W—the set of shared parameters for a given convolutional layer of the shared module 102. Given that the layer is a convolutional layer, the set of parameters for a layer can be factorized as:

$$W = UMV^T$$

The size of W is $c_i k \times c_{i-1} k$, matrix U is of size $c_i k \times r$, matrix M is of size $r \times r$ and matrix $V^T$ is of size $r \times c_{i-1} k$, and $r \geq \min(c_i k, c_{i-1} k)$.

Instead of sharing all the parameters W among the tasks A, B and C, which may potentially cause negative transfers among tasks and harm the joint performance, the factorized matrices U and $V^T$ are configured as shared parameters and M is used to capture task-specific information. According to various embodiments, M is the Hadamard product (element-wise product) of a number of matrices equal to the number of tasks (three in the example of FIG. 1) of the same size, which for the example of FIG. 1 are denoted $M_1$, $M_2$ and $M_3$. These three matrices represent task-specific factors for each individual task A, B and C, respectively. The rationale behind using Hadamard product in this knowledge sharing scheme is that Hadamard products of tensors correspond to products of multivariate functions. Matrix M will then be:

$$M = M_1 \odot M_2 \odot M_3$$

where $\odot$ denotes the Hadamard product. Regardless of the number of tasks, the Hadamard product of the task-specific matrices will result in a single matrix M.

Figure 2:
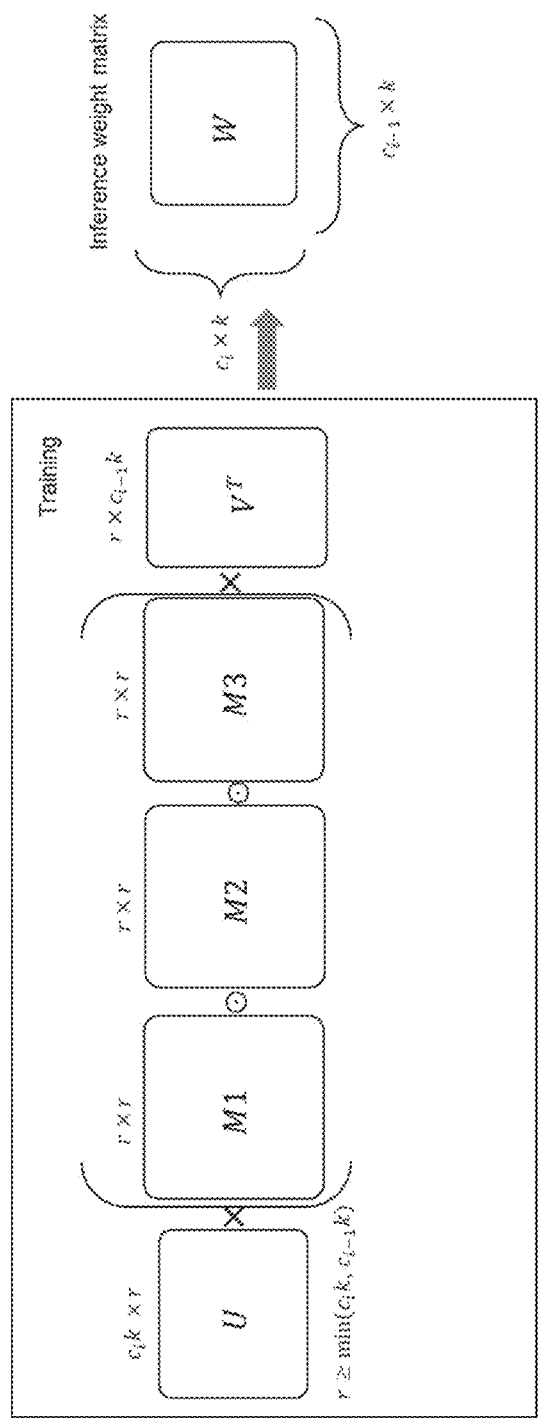
FIG. 2 illustrates the over-parameterization of a convolutional layer, according to various embodiments.

FIG. 2 illustrates an example of the over-parameterization of a convolutional layer according to the process described above for a three-task MTL neural network. The weight matrix for a given convolutional layer of the shared module 102 is factorized for training into weight matrices U, $V^T$, $M_1$, $M_2$, and $M_3$. The trained weight matrices are then multiplied together, providing weight matrix W for the convolutional layer. Weight matrix W is used for the inference model and can be deployed, for example, in an embedded machine vision system.

Practically, any number of convolutional layers in the shared module $W_{ABC}$ can be factorized using the principles described above to improve the multi-task model performance. In some variations, just a single convolutional layer out of a plurality of convolutional layers is factorized. In other variations, all convolutional layers are factorized. It will be understood that any share of the convolution layers of the shared module can be factorized. According to various embodiments, the convolutional layers in the task-specific modules $W_A$, $W_B$ and $W_C$ are not factorized.

Before training, matrices U and $V^T$ of size $c_i k \times r$ and $r \times c_{i-1} k$, respectively, may be initialized using original initialisation of weight parameter set W, and $M_1$, $M_2$, $M_3$ may be initialized as identity matrices of size $r \times r$.

During training, the set of factors $M_{1=t}$ for a given task t are updated using a specific task loss $L_{i=t}$ for the task t while all the other factors (the factors of $M_{1 \neq t}$, U and $V^T$) are frozen (i.e., the parameters are not updated). Then, matrices U and $V^T$ are updated with joint task loss $$L = \sum_i^3 L_i,$$

while all the task factors M are frozen. According to various embodiments, to reduce the conflicts of training dynamics among tasks in parameter updates, for each epoch, only one task factor $M_i$ is trained with its task specific loss. In other words, the three task factors are trained alternatively in consecutive training epochs. Thus, according to the process described above, the parameter size of the training model is enlarged from W to matrices U, $V^T$, $M_1$, $M_2$, and $M_3$ (for the three-task example of FIG. 1) during training.

During inference, the inference weight matrix W of size $c_i k \times c_{i-1} k$ for a convolutional layer is recovered by $W = UMV^T$ through matrix multiplication, where M is recovered from $M_1$, $M_2$ and $M_3$ through element-wise product $M = M_1 \odot M_2 \odot M_3$. The parameter matrix W is then reshaped back to $c_i \times c_{i-1} \times k \times k$ size tensor to be used as the parameter set for a normal convolutional layer in the inference model. Thus, according to the principles described above, the parameter size of the inference model—the model that can be deployed, for example, on an embedded device—is not increased.

Figure 3:
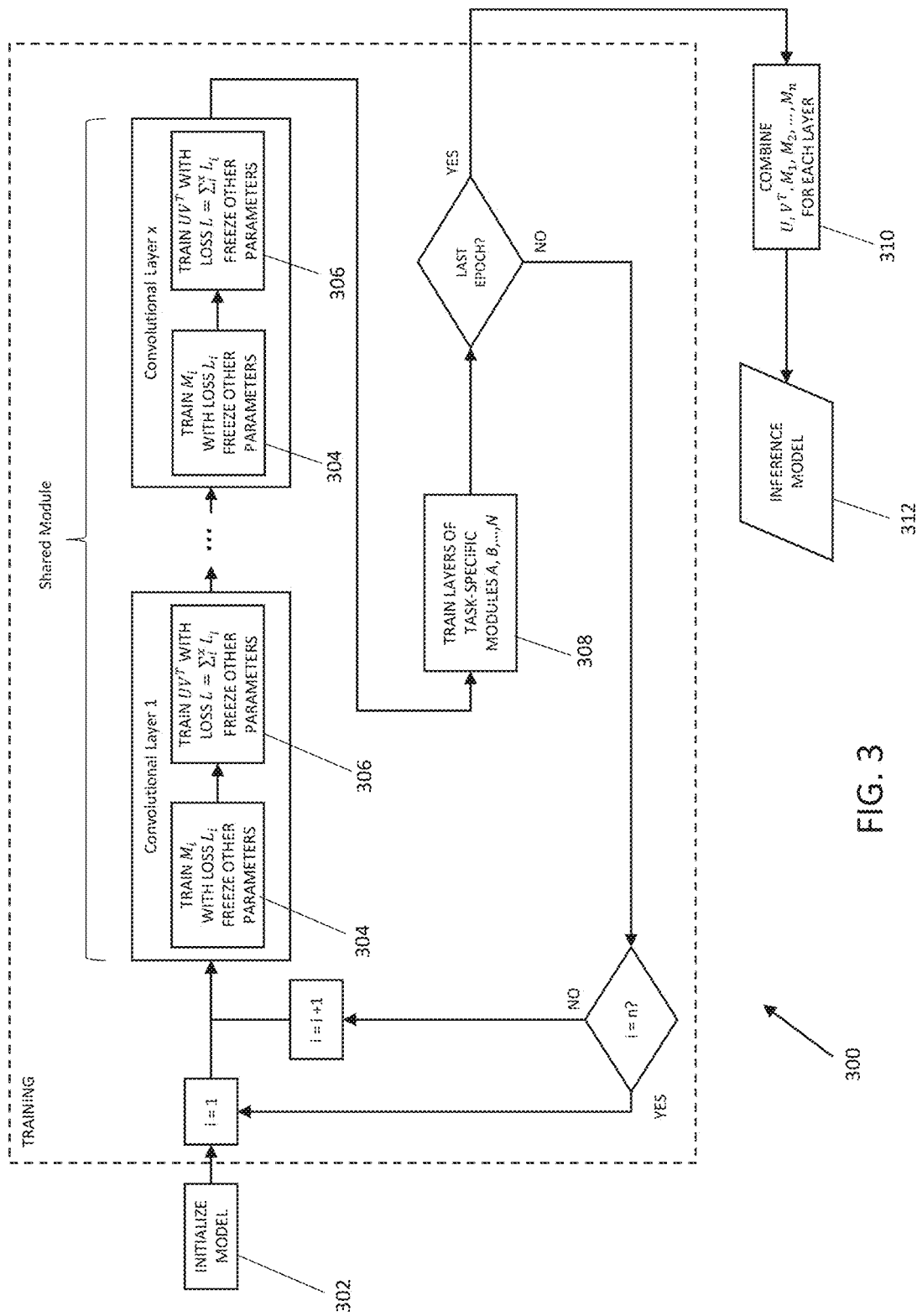
FIG. 3 is a block diagram of a method for building an MTL neural network configured for simultaneously performing n tasks, according various embodiments.

FIG. 3 is a block diagram of a method 300 for building an MTL neural network configured for simultaneously performing n tasks, according to the principles discussed above. Method 300 can be used, for example, for building neural network 100 of FIG. 1. Method 300 is a simplified representation of the training process for training an MTL neural network, focusing on the aspects of training associated with the overcomplete parameterization of the shared module. Other aspects of training an MTL neural network would be well understood to a person having ordinary skill in the art and, therefore, are omitted for brevity.

In general, a machine learning model for which method 300 can be used includes a shared module, which includes a plurality of convolutional layers, and a plurality of task-specific modules, each including a plurality of convolutional layers. The set of parameters for each of x convolutional layers of the shared module are factorized into $V^T$, $M_1$, $M_2$, ..., $M_n$ where $M_i$ is a matrix of parameters for task i of n tasks.

At step 302, the parameters of the model are initialized. The U, $V^T$ matrices are initialized using the same initialization method as the unfactorized matrix W and $M_1$, $M_2$, ..., $M_n$ are initialized into identity matrices. Training begins at step 302, with updating task-specific matrix $M_1$ of the first convolutional layer of the shared module based on training data, such as a plurality of training images. Updating of matrix $M_1$ is done using the task-specific loss function $L_1$. When updating the parameters of matrix $M_1$, all of the other parameters—the parameters of U, $V^T$, $M_2$, ..., $M_n$—are frozen (not changed). At step 306, the shared parameter of matrices U, $V^T$ are updated using a shared loss function that is a combination of the task-specific loss functions, and the take-specific parameters are frozen. Steps 304 and 306 are repeated for each convolutional layer of the shared module. Note that training processes associated with other structure of the neural network are not shown for simplicity. Once the convolutional layers of the shared module are updated, method 300 continues with step 308 in which the one or more layers of the task-specific modules are updated.

Steps 304-308 are repeated for each epoch. While the first epoch included updating the parameters of the first task-specific matrix $M_1$, the second epoch includes updating the parameters of the second task-specific matrix $M_2$ at step 304. Thus, each epoch includes the updating of a different task-specific matrix $M_1$ from the prior epoch. Steps 304-308 are repeated accordingly for the requisite number of epochs. Once the last task-specific matrix $M_n$ of the shared module is updated, the subsequent epoch will include updating the first task-specific matrix $M_1$ (i is set to 1).

After the last epoch, method 300 proceeds with step 310 in which matrices U, $V^T$, $M_2$, ..., $M_n$ for each convolutional layer of the shared module are multiplied, as described above, resulting in inference weight matrix W, which is built into an MTL inference model 312 that can be implemented in an embedded system.

Method 300 is performed using suitable training datasets, such as suitable training images. The training images can be selected and pre-processed to be the same height and width. The training images may be annotated by human labelers to include labels for each task that the MTL is to perform. For example, for an object detection task, training image labeling includes an image file name, bounding box coordinates, and the object name. As is understood by a person of skill in the art, different tasks may different have labels corresponding to the task.

The training dataset can be jointly-labelled, disjointly-labelled, or some combination of both. This means that a single training dataset (e.g., a single training image) can have labels for a single task (disjointly labelled) or multiple tasks (jointly labelled) to be trained simultaneously together. For either jointly-labelled or disjointly-labelled datasets, each training batch can include a mixed dataset from different tasks. The dataset can be mixed for the different tasks using any suitable distribution, such as a uniform distribution.

To illustrate the above points, for a jointly-labelled training dataset used to train a 4-task MTL neural network with a batch size of 256 training images, all 256 training images have labels for all 3 tasks, and the MTL neural network is trained simultaneously for all 3 tasks. In contrast, for disjointly-labelled training dataset used to train a 4-task MTL neural network with a batch size of 256 training images, there may be 64 training images labelled for each task (for a uniform distribution). During training, the 256 training images are loaded in together as one batch and the MTL neural network is trained simultaneously for all 3 tasks. In this training batch, each task-specific portion is updated by losses received from only its associated 64 images, whereas the shared portion is updated by losses received from the 256 images all together.

Thus, due to the over-parameterizing of the MTL neural network, according to the principles described within, the MTL neural network can be trained with jointly or disjointly-labelled datasets. This enables a much wider variety of training datasets to be used, making the training of the MTL neural network easier.

Figure 4:
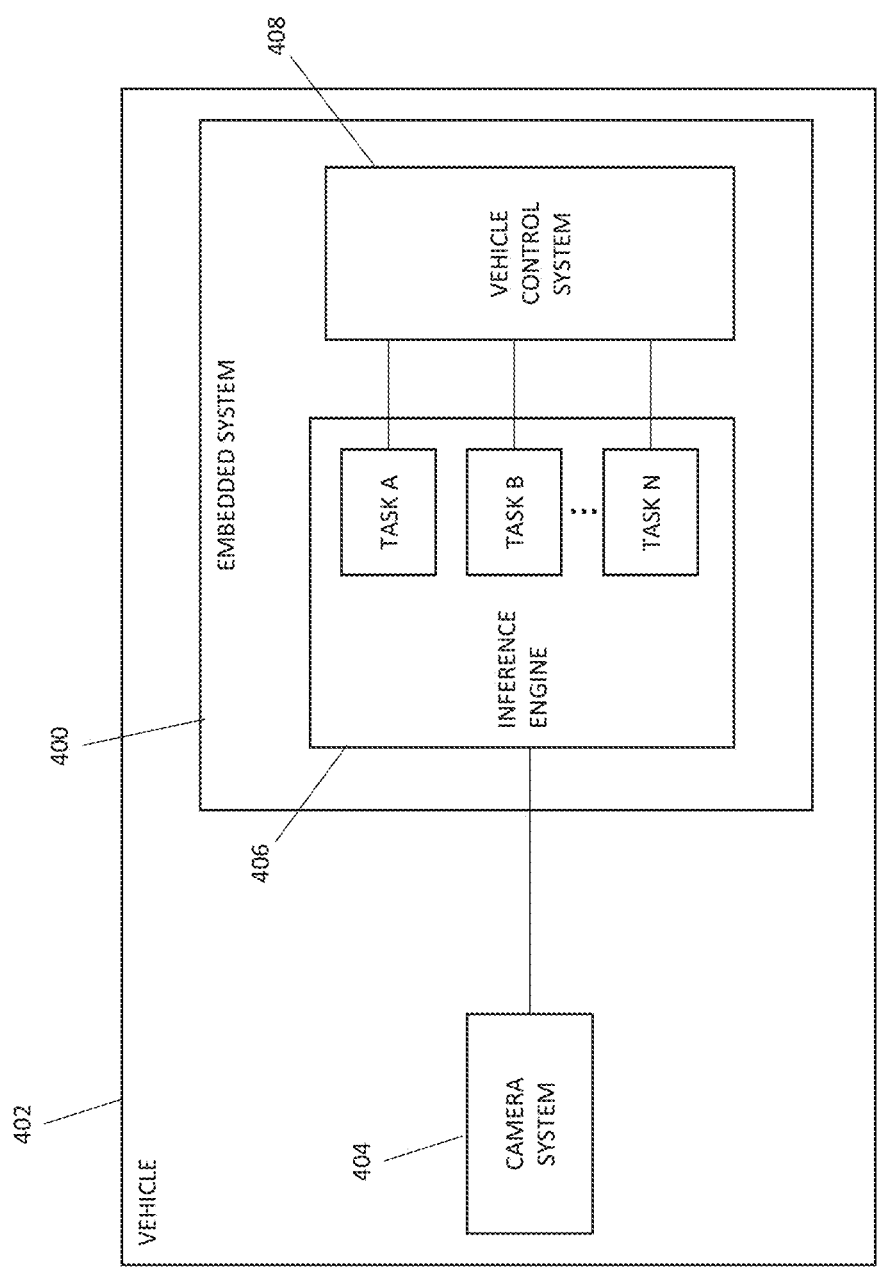
FIG. 4 illustrates an embedded system 400 that may implement an MTL neural network, according to various embodiments.

FIG. 4 illustrates an embedded system 400 that may implement an MTL neural network trained according to the principles discussed above, such as MTL inference model 312 of FIG. 3. Embedded system 400 may be installed in a vehicle 402 for performing multiple machine vision inferences tasks simultaneously on data generated using a sensor system 404. The sensor system 404 can include one or more vehicle mounted sensors, such as one or more forward-facing sensors, one or more rearward-facing sensors, and/or one or more cabin-facing sensors. The sensors can be any sensor suitable for perceiving an environment of the vehicle, including visible light cameras, LIDAR cameras, radar sensors, ultrasound sensors, or any other sensor technology.

Embedded system 400 includes an inference engine 406 that implements the MTL neural network for performing multiple (N) inference tasks on the imaging received from the sensor system 404. The MTL neural network can be configured for any suitable number and combination of inferences tasks. Examples of inference tasks include semantic segmentation, depth estimation, object detection, and surface normal estimation.

The inference engine 406 outputs predictions associated with each inference task. These predictions may be provided to a vehicle control system 408, which may use the predictions for autonomous or semi-autonomous vehicle control. Vehicle control system 408 may a part of embedded system 400 or may be a separate system that is communicatively connected to control system 408. Vehicle control system 408 can include or be communicatively connected to one or more vehicle systems, such as a steering system, a braking system, an acceleration system, and an operator interface system (which may include, for example, an on-vehicle display for communicating to the operator). In some embodiments, the vehicle control system 408 controls at least one of vehicle steering and vehicle braking, and/or provides an alert to the operator of the vehicle based on the predictions from the inference engine 406. For example, the vehicle control system 408 may control braking of the vehicle 402 according to a distance to an obstruction on the road based on, for example, a semantic segmentation, object detection, and depth estimation output from the inference engine 406.

Figure 5:
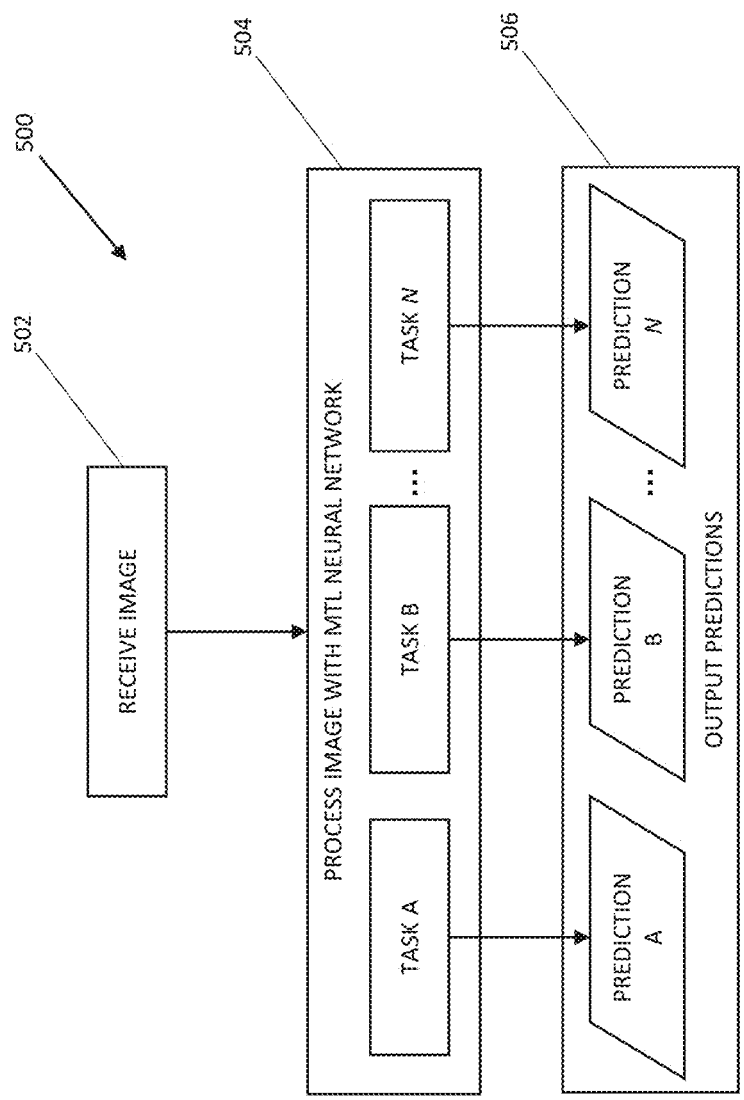
FIG. 5 is a flow diagram of a method for performing multiple tasks on an image using an MTL neural network trained, according to various embodiments.

FIG. 5 is a flow diagram of a method 500 for performing multiple tasks on an image using an MTL neural network trained according to the principles discussed above. Method 500 can be performed, for example, by an embedded computing system (such as embedded system 400 of FIG. 4) deployed in a vehicle (such as vehicle 402 of FIG. 4) in support of autonomous vehicle operation. At step 502, an image is received by a camera system, such as sensor system 404 of FIG. 4. The image may be a single snapshot image or a frame of a video. At step 504, the image is processed with an MTL neural network, such as inference model 312 of FIG. 3. The MTL neural network performs N inference tasks simultaneously on the image. Examples of inference tasks include semantic segmentation, depth estimation, object detection, object detection, instance segmentation, and surface normal estimation. The predictions from each task are output at step 506. These predictions can be used for autonomous vehicle control, as discussed above with regard to vehicle control system 408 of FIG. 4.

According to various embodiments, MTL model performance can be further enhanced without increase the inference model size, using model fine-tuning and/or knowledge distillation, which can be applied as post-processing. First, single task models (or some best-performed multitask models) of any size can be used to generate soft targets for this multi-task model to learn from it during training process. The soft target can be generated from an unsupervised dataset, which is relatively abundant compared to the more costly supervised datasets. Thus, training can be extended to a semi-supervised learning approach when both labelled and unlabelled data are available.

Second, the multi-task model after overcomplete factorization can be further fine-tuned on its batch normalization layer for a limited number of epochs (usually less than 30 epochs is enough for the fine-tuning) for each specific task. Since the number of affine parameters of batch normalisation layers is very small, the fine-tuning for each task is very fast in this post-process.

According to the principles discussed above, a MTL machine learning model includes a knowledge sharing architecture configured to improve the model performance of deep multi-task learning models without increasing the inference costs. This can be useful for any embedded vision applications where: (1) multiple tasks are to be learned together which may compete for model shared resources, and (2) the inference budget is tight for the deployed model. The approach described herein can achieve significant higher joint performance with reduced model parameter size, compared with the original deep multi-task learning models without the overcomplete factorization of the shared module described herein. This can potentially lead to a reduction of costs of the embedded devices to be used in products, without compromising the performance of the deployed deep multitask learning model.

Although the above approach is often described with respect to embedded machine vision applications, the same knowledge sharing approach for deep multi-task learning can be applied to any multi-task models with convolutional layers. This approach can potentially be useful to any applications that involve: (1) deep learning models with convolutional layers, (2) multiple tasks need to be learned simultaneously, and (3) the requirement that inference model parameter size is constrained.

Figure 6:
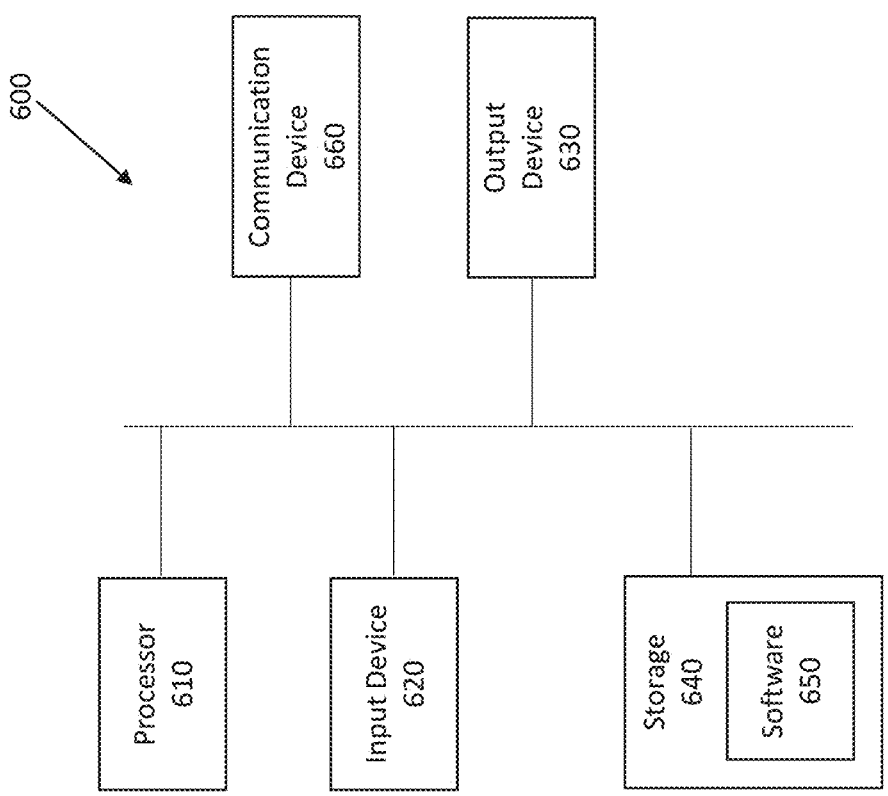
FIG. 6 illustrates an example of a computing system, according to various embodiments.

FIG. 6 illustrates an example of a computing system 600, in accordance with some embodiments. Computing system 600 can be used, for example, for training an MTL machine learning model, for example, according to method 300 of FIG. 3. Computing system 600 can be used for one or more of components of embedded system 400 of FIG. 4. System 600 can be a computer connected to a network. System 600 can be a client or a server. As shown in FIG. 6, system 600 can be any suitable type of processor-based system, such as a personal computer, workstation, server, handheld computing device (portable electronic device) such as a phone or tablet, or an embedded system or other dedicated device. The system 600 can include, for example, one or more of input device 620, output device 630, one or more processors 610, storage 640, and communication device 660. Input device 620 and output device 630 can generally correspond to those described above and can either be connectable or integrated with the computing system 600.

Input device 620 can be any suitable device that provides input, such as a touch screen, keyboard or keypad, mouse, gesture recognition component of a virtual/augmented reality system, or voice-recognition device. Output device 630 can be or include any suitable device that provides output, such as a display, touch screen, haptics device, virtual/augmented reality display, or speaker.

Storage 640 can be any suitable device that provides storage, such as an electrical, magnetic, or optical memory including a RAM, cache, hard drive, removable storage disk, or other non-transitory computer readable medium. Communication device 660 can include any suitable device capable of transmitting and receiving signals over a network, such as a network interface chip or device. The components of the computing system 600 can be connected in any suitable manner, such as via a physical bus or wirelessly.

Processor(s) 610 can be any suitable processor or combination of processors, including any of, or any combination of, a central processing unit (CPU), graphics processing unit (GPU), field programmable gate array (FPGA), and application-specific integrated circuit (ASIC). Software 650, which can be stored in storage 640 and executed by one or more processors 610, can include, for example, the programming that embodies the functionality or portions of the functionality of the present disclosure (e.g., as embodied in the devices as described above). For example, software 650 can include one or more programs for execution by one or more processor(s) 610 for performing one or more of the steps of method 300 and/or method 500.

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A computer-implemented method for automatically controlling a vehicle, the method comprising:
   receiving data generated using at least one sensor of the vehicle;
   simultaneously performing multiple different prediction tasks on the data using a multi-task neural network, wherein the multi-task neural network comprises at least one shared parameter inference matrix comprising parameters shared between the multiple different prediction tasks, and the at least one shared parameter inference matrix was over-parameterized during training into at least one shared parameter matrix and multiple task-specific parameter matrices, each of the multiple task-specific parameter matrices being associated with a different one of the multiple different tasks; and
   automatically controlling the vehicle based on results of the multiple different prediction tasks.

2. The method of claim 1, wherein the multiple different prediction tasks comprise semantic segmentation, depth estimation, object detection, instance segmentation, or surface normal estimation.

3. The method of claim 1, wherein the multi-task neural network comprises task-specific parameter inference matrices associated with the multiple different prediction tasks.

4. The method of claim 1, wherein during training of the multi-task neural network, each of the multiple task-specific parameter matrices was trained independently using a respective task-specific loss function.

5. The method of claim 1, wherein during training of the multi-task neural network, the at least one shared parameter matrix was trained independently of the multiple task-specific parameter matrices using a shared task loss function.

6. The method of claim 1, wherein automatically controlling the vehicle based on results of the multiple different prediction tasks comprises steering the vehicle, braking the vehicle, or providing an alert to an operator of the vehicle.

7. A computing system for automatically controlling a vehicle, the computing system comprising one or more processors and memory storing one or more programs for execution by the one or more processors for, the one or more programs including instructions for:
   receiving data generated using at least one sensor of the vehicle;
   simultaneously performing multiple different prediction tasks on the data using a multi-task neural network, wherein the multi-task neural network comprises at least one shared parameter inference matrix comprising parameters shared between the multiple different prediction tasks, and the at least one shared parameter inference matrix was over-parameterized during training into at least one shared parameter matrix and multiple task-specific parameter matrices, each of the multiple task-specific parameter matrices being associated with a different one of the multiple different tasks; and automatically controlling the vehicle based on results of the multiple different prediction tasks.

8. The computing system of claim 7, wherein the computing system is an embedded computing system of the vehicle.

9. The computing system of claim 7, wherein the multiple different prediction tasks comprise semantic segmentation, depth estimation, object detection, instance segmentation, or surface normal estimation.

10. The computing system of claim 7, wherein the multi-task neural network comprises task-specific parameter inference matrices associated with the multiple different prediction tasks.

11. The computing system of claim 7, wherein during training of the multi-task neural network, each of the multiple task-specific parameter matrices was trained independently using a respective task-specific loss function.

12. The computing system of claim 7, wherein during training of the multi-task neural network, the at least one shared parameter matrix was trained independently of the multiple task-specific parameter matrices using a shared task loss function.

13. A method for generating a multi-task machine learned neural network that can perform prediction tasks based on sensor data of a vehicle for automatically controlling the vehicle, the method comprising:
    training a multi-task learning neural network on a plurality of training datasets, the multi-task learning neural network comprising:
    a plurality of task-specific parameter sets, each task-specific parameter set dedicated to a different task, and
    a shared parameter set comprising at least one over-parameterized convolutional layer, the at least one over-parameterized convolutional layer comprising at least one shared parameter matrix and a plurality of task-specific parameter matrices;
    generating a multi-task machine learned neural network for simultaneously performing multiple different prediction tasks on the sensor data of the vehicle, the multi-task machine learned neural network comprising the trained plurality of task-specific parameter sets and a trained shared parameter set that comprises a matrix that is a combination of the trained at least one shared parameter matrix and the trained plurality of task-specific parameter matrices; and
    embedding the multi-task machine learned neural network into a computing system for the vehicle such that the computing system can perform the multiple different prediction tasks on the sensor data of the vehicle and automatically control the vehicle based on results of the multiple different prediction tasks.

14. The method of claim 13, wherein the multiple different prediction tasks comprise semantic segmentation, depth estimation, object detection, instance segmentation, or surface normal estimation.

15. The method of claim 13, wherein training the multi-task learning network comprises updating factors one of the plurality of task-specific parameter matrices using a task-specific loss function while freezing factors of any other of the plurality of task-specific parameter matrices.

16. The method of claim 15, wherein training the multi-task learning network comprises updating factors of the at least one shared parameter matrix using a shared loss function while freezing parameters of the plurality of task-specific parameter matrices.

17. The method of claim 13, wherein the multi-task learning neural network comprises a plurality of over-parameterized convolutional layers.

18. The method of claim 13, wherein the matrix multiplication of the trained at least one shared parameter matrix and the trained plurality of task-specific parameter matrices comprises an element-wise product of the trained plurality of task-specific parameter matrices.

19. The method of claim 13, wherein the outputs of the shared module are provided as inputs to each of the plurality of task-specific modules and each task-specific module is not interconnected with any other task-specific module.

20. The method of claim 13, wherein the matrix that is a combination of the trained at least one shared parameter matrix and the trained plurality of task-specific parameter matrices is generated by matrix multiplying the at least one shared parameter matrix with a Hadamard product of the trained plurality of task-specific parameter matrices.

21. A computing system for generating a multi-task machine learned neural network that can perform prediction tasks based on sensor data of a vehicle for automatically controlling the vehicle, the computing system comprising one or more processors and memory storing one or more programs for execution by the one or more processors, the one or more programs including instructions for:
    training a multi-task learning neural network on a plurality of training datasets, the multi-task learning neural network comprising:
    a plurality of task-specific parameter sets, each task-specific parameter set dedicated to a different task, and
    a shared parameter set comprising at least one over-parameterized convolutional layer, the at least one over-parameterized convolutional layer comprising at least one shared parameter matrix and a plurality of task-specific parameter matrices;
    generating a multi-task machine learned neural network for simultaneously performing multiple different prediction tasks on a dataset, the multi-task machine learned neural network comprising the trained plurality of task-specific parameter sets and a trained shared parameter set that comprises a matrix that is a combination of the trained at least one shared parameter matrix and the trained plurality of task-specific parameter matrices; and
    storing the multi-task machine learned neural network for embedding into a computing system for the vehicle such that the computing system can perform the multiple different prediction tasks on the sensor data of the vehicle and automatically control the vehicle based on results of the multiple different prediction tasks.

22. The computing system of claim 21, wherein the multiple different prediction tasks comprise semantic segmentation, depth estimation, object detection, instance segmentation, or surface normal estimation.

23. The computing system of claim 21, wherein training the multi-task learning network comprises updating factors one of the plurality of task-specific parameter matrices using a task-specific loss function while freezing factors of any other of the plurality of task-specific parameter matrices.

24. The computing system of claim 23, wherein training the multi-task learning network comprises updating factors of the at least one shared parameter matrix using a shared loss function while freezing parameters of the plurality of task-specific parameter matrices.

25. The computing system of claim 21, wherein the multi-task learning neural network comprises a plurality of over-parameterized convolutional layers.

26. The computing system of claim 21, wherein the matrix multiplication of the trained at least one shared parameter matrix and the trained plurality of task-specific parameter matrices comprises an element-wise product of the trained plurality of task-specific parameter matrices.

27. The computing system of claim 21, wherein the outputs of the shared module are provided as inputs to each of the plurality of task-specific modules and each task-specific module is not interconnected with any other task-specific module.

28. The computing system of claim 21, wherein the matrix that is a combination of the trained at least one shared parameter matrix and the trained plurality of task-specific parameter matrices is a matrix multiplication of the at least one shared parameter matrix and a Hadamard product of the trained plurality of task-specific parameter matrices.

* * * * *